United States Patent [19]
Courtepatte et al.

[11] 3,978,589
[45] Sept. 7, 1976

[54] APPARATUS FOR MEASURING TWO DIMENSIONS OF AN OBJECT AND COMBINING THE MEASURED VALUES TO OBTAIN SINGLE VALUE

[76] Inventors: Lawrence Alvin Courtepatte, 14607 - 86 St., Edmonton, Alberta, Canada, P5E 3C6; Kenneth Wilbur Currie, 16716 - 81 Ave., Edmonton, Alberta, Canada, T5R 3P7

[22] Filed: Apr. 7, 1975

[21] Appl. No.: 565,566

[30] Foreign Application Priority Data
Nov. 28, 1974 Canada ................................ 214805

[52] U.S. Cl. ............................ 33/143 R; 33/178 R; 33/180 AT
[51] Int. Cl.² ....................... G01B 5/08; G01B 5/02
[58] Field of Search ......... 33/143 R, 143 M, 169 R, 33/178 R, 180 AT, 147 K, 148 R, 149 R, 121, 1 V

[56] References Cited
UNITED STATES PATENTS

| | | | |
|---|---|---|---|
| 1,989,252 | 1/1935 | Walter | 33/121 |
| 3,138,876 | 6/1964 | Graham | 33/143 M |

*Primary Examiner*—Richard E. Aegerter
*Assistant Examiner*—Willis Little
*Attorney, Agent, or Firm*—Burns, Doane, Swecker & Mathis

[57] ABSTRACT

Apparatus for measuring two dimensions of an object and combining the measured values to obtain a single value is disclosed. The apparatus comprises means establishing a fixed reference point, first means movable with respect to the fixed reference point and adapted to measure one dimension of the object, second means movable with respect to the fixed reference point and adapted to measure a second dimension of the object, a fixed reference frame and indicating means wherein said first movable means and said second movable means are connected by motion transmitting means to the indicating means whose position with respect to the fixed reference frame is determined by the positions of said first and second movable means. In a particular embodiment, this invention relates to a device which can be used to measure the inside diameter and height of internal combustion engine air filters having the configuration of a hollow cylinder which device automatically combines the two measurements to obtain a single value that is read off a reference frame, the value comprising the model number of a replacement air filter.

9 Claims, 3 Drawing Figures

APPARATUS FOR MEASURING TWO DIMENSIONS OF AN OBJECT AND COMBINING THE MEASURED VALUES TO OBTAIN SINGLE VALUE

BACKGROUND OF THE INVENTION

This invention relates to apparatus for measuring two dimensions of an object and combining the measured values to obtain a single value. In particular embodiment, this invention relates to a device which can be used to measure the inside diameter and height of internal combustion engine air filters having the configuration of a hollow cylinder, and which device automatically combines the two measurements to obtain a single value that is read off a reference frame, the value comprising the model number of a replacement air filter.

At the present time, when it becomes necessary to replace the air filter of an automobile internal combustion engine, one must consult a manufacturer's catalogue which identifies the correct replacement filter for each model of vehicle and engine displacement. For the inexperienced employee, and even for the experienced, this is a time consuming method and errors frequently occur. When the apparatus of this invention is used, the correct replacement filter can be accurately determined in a matter of seconds cutting down significantly on customer waiting time.

The principle of this invention may also be used to construct a device that will measure two dimensions of other types of objects which can be uniquely identified by combining such dimensions to obtain a single value.

SUMMARY OF THE INVENTION

The objects of this invention are achieved by apparatus comprising means establishing a fixed reference point, first means movable with respect to the fixed reference point and adapted to measure one dimension of the object, second means movable with respect to the fixed reference point and adapted to measure a second dimension of the object, a fixed reference frame and indicating means wherein said first movable means and said second movable means are connected by motion transmitting means to the indicating means whose position with respect to the fixed reference frame is determined by the positions of said first and second movable means.

BRIEF DESCRIPTION OF THE DRAWINGS

The structure and operation of the invention may be better understood from the following description given in connection with the following drawings in which.

DESCRIPTION OF THE PREFERRED EMBODIMENT

The invention will now be described in relation to the preferred embodiment.

Figure 1:
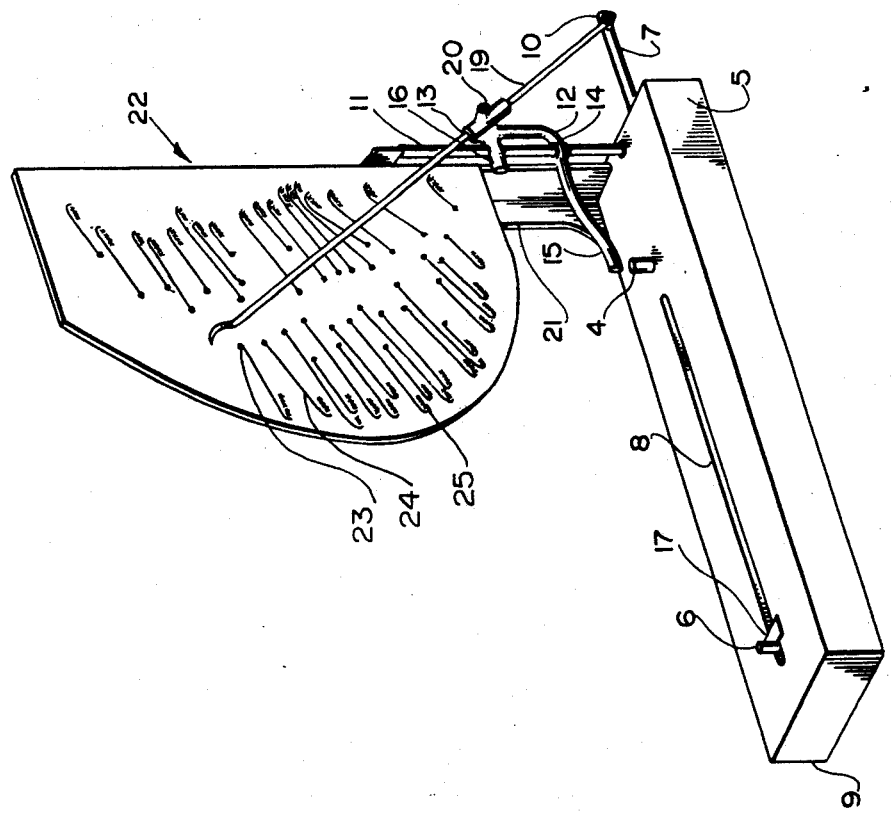
FIG. 1 is a perspective view of the preferred embodiment of the invention.
Figure 2:
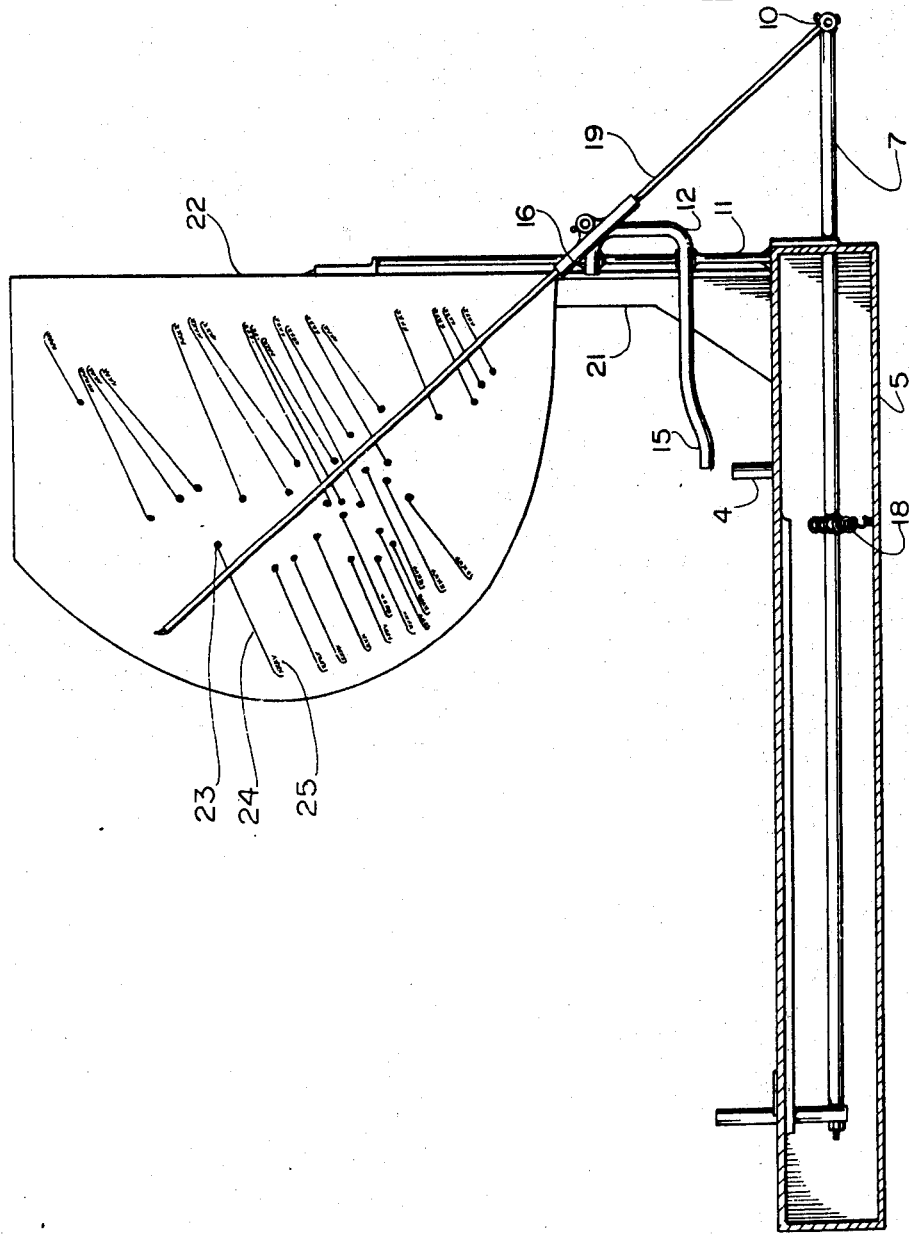
FIG. 2 is a front elevation of the preferred embodiment partially in section.

Referring to FIGS. 1 and 2, the fixed reference point consists of a first short cylindrical peg 4, firmly attached to and near one end of a hollow base 5. The material of construction of the peg and base is preferably steel but may be any other suitable material, such as wood or plastic. Construction material is not critical to the operation of this invention.

In the preferred embodiment, the first means movable with respect to the fixed reference point consists of a second cylindrical peg 6, which is securely attached to a stiff lever 7, which extends horizontally through the hollow body of the base. The peg 6 may be secured to the lever 7 by any suitable means such as a nut and bolt.

Figure 3:
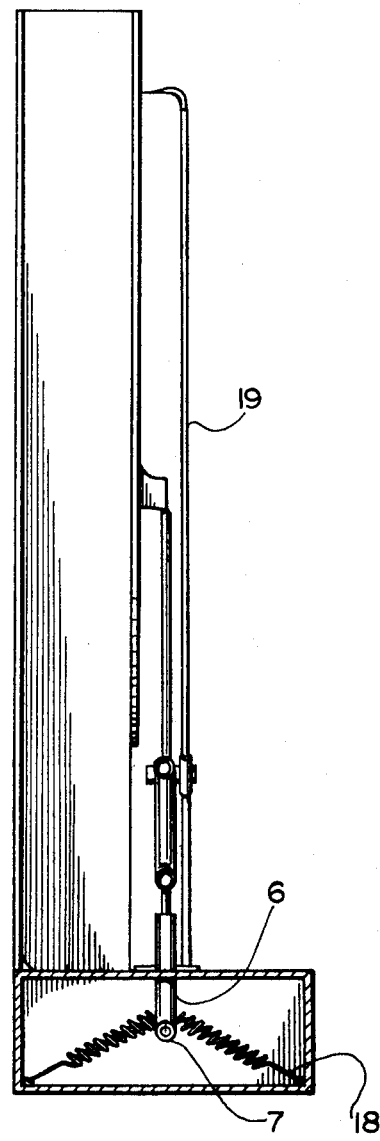
FIG. 3 is a side elevation of the preferred embodiment also partially in section.

A narrow slot 8 is cut into the top face of the base 5, and runs longitudinally along the middle of the top face of the base 5 beginning at a point adjacent the first peg 4, and terminating near the end 9 of the base 5 farthest from the peg 4. As shown in FIG. 3, the lever 7 is positioned immediately below the slot 8, such that when the rod is extended outwardly from the base 5, the second peg 6 will slide along the slot, and thus the distance between the fixed peg and the movable peg is variable. Preferably, the movable peg 6 has attached to it retaining means 17 at least as wide as the slot 8, in order to keep the travel of the lever 7 parallel with the top face of the base. Tensioning means, such as the spring 18, may be secured to the bottom inside of the base, best shown in FIGS. 2 and 3, and installed so as to exert a downward force on the rod 7 in order to prevent upward movement of the rod and thereby maintaining the rod parallel with the top face of the base.

The length of the base and, consequently, the allowable length of the slot, is determined by the specific application for which the device is intended to be used. For identifying air filters with a range of internal diameter from 2.5 inches to 14.25 inches, a 24 inch base with a 6 inch width has been used.

In the fully retracted position, i.e. when the distance between the pegs 5 and 6 is at a maximum, the extremity of the lever 10 opposite the peg 6 extends beyond the base a short distance. The minimum distance which lever 10 extends beyond the base is determined by the conceivable range of sizes of the objects to be measured for a given application. For identifying a full range of air filters, as referred to above, a distance of six inches has been found adequate to cover the range.

At the end of the base 5 closest to the fixed peg 4 a vertical axis 11 projects upwardly from and is secured to, the base 5. The vertical axis 11 may comprise a cylindrical steel rod, or any other suitable structure. The minimum height of the axis 11 is determined by the range of sizes of the objects to be measured. In the air filter application a height of approximately 10 inches has been found acceptable.

The two arms of a generally U-shaped pointer 12 which is horizontally inclined to the axis intersect the axis 11 at two points, 13 and 14. Referring to FIGS. 1 and 2, the bottom arm 15 of the pointer 12 may be longer than the upper arm 16. Arm 15 is adapted to extend to a point immediately above the fixed peg 4. The reason for this will become clear when the method of operation is described.

The pointer 12 is free to travel vertically along the axis 11. It is possible to design a pointer which intersects the axis at only one point.

At the extremity of the rod 10 a second pointer 19 is rotatably connected to the rod 10. A guide 20 is rotatably mounted on first pointer 12. Second pointer 19 passes through, and is movable within, guide 20. The first pointer 12 and the guide 20 may be of unitary construction. When either the rod 7 is moved inwardly or outwardly from the base or the first pointer 12 is moved up or down along the axis 11 the second pointer 19 is free to rotate about the pivotal point of connection at the extremity of the rod 10.

A fixed reference frame 22 is supported on a stand 21 adjacent the second pointer. The reference frame has marked on it a number of points 23, each point corresponding to a model designation which identifies the object. The points may correspond to the entire range of models of the particular object which it is desired to identify. Lines 24 extend from the points 23 to model designations 25, which are marked on the reference frame.

In operation, one extremity of the object to be identified, which, for the purpose of this description, will be taken to be a hollow cylindrical air filter, is abutted against the first peg 4 which constitutes means establishing a fixed reference point. The movable peg 6 which constitutes first means movable with respect to the fixed reference point, is adjusted to the opposite extremity of the object to be measured. When used to identify air filters, or any other hollow cylindrical object, it is preferable to abut the pegs at points on the inside circumference. The movement of the movable peg 6 is transmitted by the lever 7 to the pointer 19.

With the object resting squarely on the top face of the base 5, the arm 15 of the pointer 12 is positioned to the extremity of the second dimension of the object. The movement of the first pointer 12 is transmitted to the second pointer 19 by the cylindrical guide 20. When these two movements have been completed, the pointer 19 which serves as indicating means, comes to rest and the correct model number of the object may be read off the fixed reference frame by the operator.

The reference frame may be calibrated for a series of models produced by a specific manufacturer. Each of the entire range of models is in turn placed on the device and the above movements of the variable peg 6 and pointer 12 are performed. The point on the reference frame 22 at which the pointer 19 comes to rest for each specific model is then marked with the appropriate designation of that object. When the entire series has been marked off, the device is ready for operation.

My invention has been particularly described in terms of a device for selecting a replacement air filter. It is obvious that many different mechanical arrangements could be used for identifying air filters or other objects susceptible of identification by measurement of two dimensions, without departing from the spirit or principle of my invention.

The embodiments of the invention in which an exclusive property or privilege is claimed are defined as follows:

1. Apparatus for measuring two dimensions of an object and combining the measured values to obtain a single value, comprising:
   means establishing a fixed reference point,
   first means movable with respect to the fixed reference point and adapted to measure one dimension of the object,
   second means movable with respect to the fixed reference point and adapted to measure a second dimension of the object,
   a fixed reference frame,
   a single indicator associated with said first and second movable means, said indicator being movable relative to said reference frame, and
   motion transmitting means physically connecting both said first movable means and said second movable means to said single indicator for positioning said indicator with respect to the fixed reference frame in dependence upon the positions of both said first and second movable means.

2. Apparatus as defined in claim 1 wherein the object is a hollow cylinder; said means establishing a fixed reference point being a peg on a fixed base; said first movable means being a peg movable horizontally within a slot in the fixed base; said second movable means being a first pointer movable on a vertical axis attached to the fixed base; said reference frame comprising a plate vertically mounted on the fixed base; said movable peg being rigidly attached to a lever extending horizontally along the fixed base, and said indicating means comprising a second pointer rotatably mounted on an end of said lever remote from said movable peg, said second pointer passing through, and movable within, a guide rotatably mounted upon said first pointer, said second pointer terminating within the area of said reference frame.

3. Apparatus as defined in claim 2 wherein said hollow cylinder is an air filter, said reference frame plate being calibrated with a plurality of points determined in accordance with the height and inside diameter of a plurality of air filter, each point being identified by the model number of the air filter to which it corresponds.

4. Apparatus for selecting a replacement air filter for a motor vehicle wherein the filter to be replaced has the configuration of a hollow cylinder, by measuring the internal diameter and height dimensions of the filter to be replaced, and physically combining the measured values to obtain a single value that identifies the replacement filter; said apparatus comprising:
   a fixed base having a longitudinal slot therein;
   a fixed peg adjacent one end of the slot;
   a second peg movable horizontally within the slot along one of said dimensions of the filter;
   a lever extending parallel to the slot beneath the fixed base and connected to said movable peg;
   a vertical axis attached to the fixed base and extending upwardly therefrom between the fixed peg and the end of the base nearest the fixed peg;
   a first pointer extending to a point substantially above the fixed peg and movably mounted on said vertical axis along the other dimension of the filter;
   a bushing rotatably mounted on said first pointer;
   a reference frame vertically mounted on the fixed base, said reference frame comprising a plate calibrated with a plurality of points, each point being identified by the model number of the air filter to which it corresponds;
   a second pointer rotatably mounted on an end of said lever remote from said movable peg, said second pointer passing through, and slidable within, said bushing, said second pointer terminating within the area of said reference frame.

5. Apparatus as defined in claim 4 which further includes tensioning means arranged to exert a downwad force on said rod, and retaining means, at least as wide as said slot, attached to said second peg to maintain said second peg in said slot.

6. Apparatus as defined in claim 5 in which said tensioning means is a spring.

7. A method of identifying an object by measuring two dimensions thereof and combining the measured values to obtain a single value that identifies the object, comprising:

positioning the object in a predetermined position established by a fixed reference point;

moving first movable means along one dimension of the object so as to measure that dimension with respect to the fixed reference point;

moving second movable means along another dimension of the object so as to measure that dimension with respect to the fixed reference point; and mechanically transmitting the movements of both said first and second movable means to a single indicator associated therewith and connected thereto, to displace said indicator relative to a fixed reference frame to a position determined by both of said movements.

8. A method according to claim 7 wherein said positioning step comprises the step of positioning a hollow cylinder against a fixed reference point, said first-named moving step comprises the step of moving first movable means along the axial dimension of said cylinder, and said second-named moving step comprises the step of moving second movable means along the diameter of said cylinder.

9. A method of selecting a replacement air filter for a motor vehicle where the filter to be replaced has the configuration of a hollow cylinder, comprising:

positioning the filter to be replaced upon a fixed base having a longitudinal slot therein over a fixed peg adjacent one end of the slot and over a second peg movable horizontally within the slot, said movable peg being attached to a lever extending parallel to the slot beneath the fixed base;

moving said second peg into contact with the interior surface of said filter so that an imaginary line joining said fixed peg and said second peg coincides with a diameter of the interior cylindrical surface of said filter;

moving into contact with the upper surface of said air filter a first pointer movably mounted on a vertical axis attached to the fixed base and extending upwardly therefrom between the fixed peg and the end of the base nearest the peg, said pointer having a bushing rotatably mounted thereon;

mechanically transmitting the movements of both said second peg and said first pointer to a second pointer connected to said second peg and said first pointer to:

rotate said second pointer about a pivot connected for movement with said second peg, and slide said second pointer within a bushing rotatably carried by said first pointer so as to move said second pointer relative to a stationary reference frame to a position determined by both of said movements, and reading from said reference frame the model number of a point on said reference frame closest to the end of said second pointer.

* * * * *